April 11, 1967  R. G. HENTSCHEL  3,314,006
VARIABLE FREQUENCY EDDY CURRENT TEST DEVICE WITH VARIABLE
MEANS FOR MAINTAINING THE APPARENT IMPEDANCE
OF THE PROBE CONSTANT AT ALL FREQUENCIES
Filed April 19, 1965
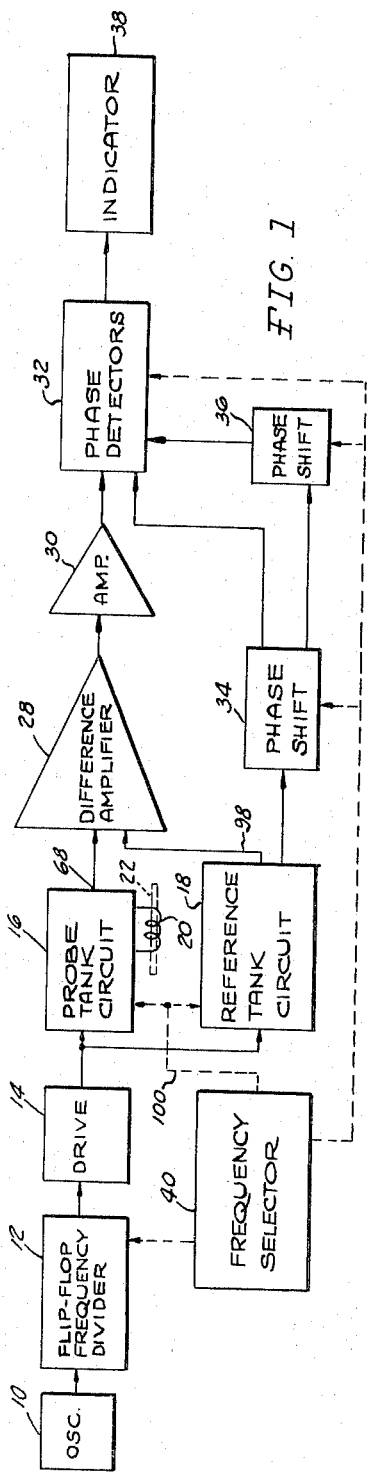
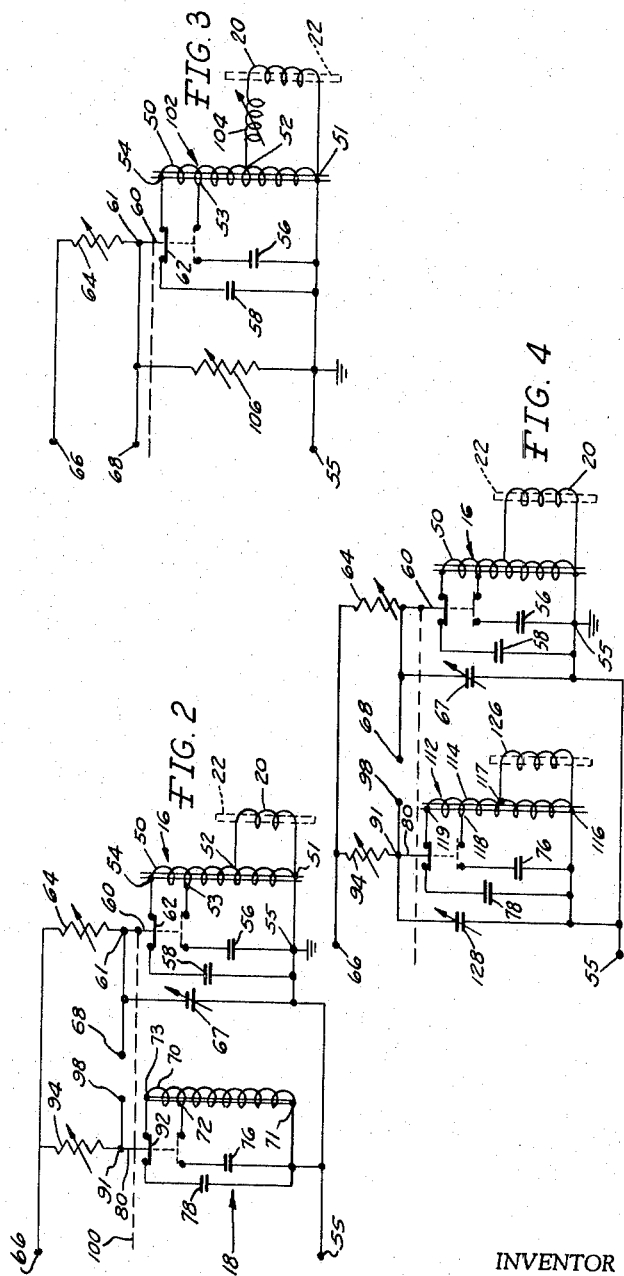
INVENTOR
RUDOLF G. HENTSCHEL
BY *Olsen and Stephenson*
ATTORNEYS

United States Patent Office 3,314,006
Patented Apr. 11, 1967

3,314,006
VARIABLE FREQUENCY EDDY CURRENT TEST DEVICE WITH VARIABLE MEANS FOR MAINTAINING THE APPARENT IMPEDANCE OF THE PROBE CONSTANT AT ALL FREQUENCIES
Rudolf G. Hentschel, Ann Arbor, Mich., assignor to Automation-Forster, Inc., a corporation of Michigan
Filed Apr. 19, 1965, Ser. No. 449,055
10 Claims. (Cl. 324—40)

This invention relates to non-destructive material testing and in particular to a multi-frequency probe circuit for eddy current testing apparatus and the like.

One type of eddy current testing apparatus generally comprises a pair of differential coils excited by an alternating current drive signal either directly or indirectly through primary windings. One of the coils serves as a probe into which a test specimen is inserted. A standard specimen is inserted into the other coil. Differences in characteristics of the test and standard specimen are reflected as impedance differences between the coils. Thus the outputs from the coils may be compared to provide a difference signal having phase and amplitude variations related to differences in the characteristics of the standard and test specimens. The difference signal is demodulated by quadrature control signals derived from the drive signal to yield a pair of unidirectional voltages which have relative magnitudes determined by the magnitude and phase of the difference signal relative to the magnitude and phase of the control signals. The unidirectional voltages are applied to respective vertical and horizontal deflection systems of a cathode ray tube to display the difference signal as a vector point whose magnitude and direction are related to differences in the characteristics of the test and standard specimens. One testing apparatus of the above-mentioned type is disclosed in U.S. Letters Patent 2,806,992, entiled, "Measuring and Testing Instruments," granted Sept. 17, 1957 in the name of Friederich Foerster.

In testing apparatus of the type disclosed in the Foerster patent, as well as numerous other types of testing apparatus employing an inductive probe, it is frequently desirable to use one piece of equipment operated at different frequencies, for example, from below 100 cycles per second to several hundred kilocycles, depending on the type of test and the particular material being tested. However, since the probe is inductive, the impedance of the probe and thus the probe output will vary substantially over a wide range of test frequencies. The impedance variation of a single probe with frequency would so greatly affect the sensitivity of the test apparatus, that the apparatus would be of little, if any, practical value. Larger drive levels could be used with decreasing frequency, and vice versa, but this approach would require an inconveniently large drive at lower frequencies and sufficiently different circuitry as to be practically useless at higher frequencies. Although a different probe could be used at each frequency, such an arrangement is also commercially impractical in view of the large number of probes that would have to be provided in a multi-frequency testing apparatus that is useful over a wide frequency range. It is common practice to use coils of various shapes and sizes depending on the type of specimen under test, for example, solenoid coils, inside coils, hand-probe coils, fork-shaped coils, and special coil shapes for specific test objects. Thus a practical commercial instrument would include a large number of probes having different coil shapes with each coil shape being duplicated in a probe for use at each test frequency. It is therefore highly desirable that a single probe be usable over a wide range of test frequencies.

One object of the present invention is to provide an eddy current measuring and testing method and apparatus that are useful over a wide range of test frequencies.

Another object of this invention is to provide a probe circuit for use in a multi-frequency instrument that is constructed simply and economically; that is easy to use; and that operates effectively over a wide range of frequencies with a single probe and thus eliminates duplication of probes for each test frequency.

Further objects, features and advantages of this invention will become apparent from a consideration of the following description, the appended claims, and the accompanying drawing in which:

FIGURE 1 is a block diagram of a multi-frequency testing apparatus constructed in accordance with the present invention wherein impedance changes in a probe tank circuit are compared to the impedance of a reference tank circuit with each tank circuit having components that can be selectively interconnected for operation at different test frequencies;

FIGURE 2 is a schematic circuit diagram of the probe tank circuit and the reference tank circuit with a single probe transformer coupled into the probe tank circuit in accordance with the present invention by an autotransformer having a plurality of taps which are used selectively at different test frequencies;

FIGURE 3 is a circuit diagram of a modification in the probe tank circuit illustrated in FIG. 2 including a variable inductor connected between the autotransformer and the probe to compensate for impedance changes in the probe when a specimen is inserted into the probe; and FIGURE 4 is a circuit diagram illustrating a modification in the tank circuit shown in FIG. 2 wherein a test specimen is compared directly to a standard specimen by a pair of probe tank circuits.

Referring to FIG. 1, an eddy-current testing apparatus is illustrated as generally comprising a stable frequency oscillator 10 whose output is connected to a frequency divider 12 which in turn is connected to a drive circuit 14. Oscillator 10 is a crystal controlled oscillator to provide an alternating current signal of very precise frequency. Frequency divider 12 includes a series or chain of conventional flip-flop or binary circuits which provide a square wave output, the frequency of which can be selected by changing the position in the chain at which the output is taken. The square wave output from divider 12 is clipped and shaped by drive circuit 14 to provide a precise square wave drive signal.

The output from drive 14 is applied to a probe tank circuit 16 and to a reference tank circuit 18 both of which are resonant at the drive frequency. A probe coil 20 is coupled in tank circuit 16 and is adapted to receive a test specimen 22. When specimen 22 is inserted in coil 20, the impedance of tank circuit 16 changes so that the sinusoidal output from the probe tank circuit 16 has phase and amplitude variations representing the characteristics of the specimen 22. The output from the probe tank circuit 16 is compared with the output of the reference tank circuit 18 by a difference amplifier 28 to provide a sinusoidal difference signal representing variations in the characteristics of specimen 22 from a standard determined by tank circuit 18. The difference signal from amplifier 28 is amplified by amplifier 30 which has broad band characteristics and a variable gain to control the sensitivity of the test apparatus. The amplified difference signal from amplifier 30 is connected to a pair of phase detectors 32 which are controlled by a pair of quadrature control signals derived from the reference tank circuit 18 through a pair of phase shift circuits 34, 36. Phase shift circuit 36 introduces a 90° phase difference between the two control signals whereas phase shift circuit 34 varies the phase of both control signals relative to the phase of the reference output from tank circuit 18. The output from phase detectors 32 is a pair of unidirectional voltages representing quadrature components of the difference signal from amplifier 30 as explained more fully in the aforementioned Foerster patent. The output from phase detectors 32 may be displayed on a suitable indicator 38 such as an oscilloscope.

In accordance with one aspect of the present invention a frequency selector 40 is mechanically connected to frequency divider 12, tank circuits 16, 18 and phase detectors 32, as shown by dash line connections in FIG. 1 to change the drive frequency and vary components in tank circuits 16, 18 and in phase detectors 32 for operation at the frequency selected by an operator. Frequency selector 40 also has mechanical connections to phase shift circuits 34, 36, and to phase detectors 32 to vary components in these circuits for operation at the frequency selected. When a particular test frequency is selected by means of frequency selector 40, components in the probe tank circuit 16 and the reference tank circuit 18 are automatically switched to tune the tank circuits to parallel resonance at the test frequencies selected. Because the tank circuits 16, 18 are operating at resonance the square wave output from drive 14 appears as a sinusoidal signal in the tank circuits. Additionally in accordance with one important aspect of the present invention, when the tank circuits 16, 18 are switched to operate at different frequencies, the tank circuits are arranged to present a constant predetermind impedance to the drive by compensating for inductive impedance variations in coil 20 with frequency. When a specimen 22 in inserted into coil 20, tank circuit 16, 18 are manually adjusted so that the output from difference amplifier 28 is zero. When specimen 22 is removed from coil 20 and a second test specimen is inserted into the coil, any difference in the characteristics of this specimen from specimen 22 will provide a difference signal from amplifier 28 which will be displayed on indicator 38.

Referring to the construction and operation of tank circuits 16 and 18 in greater detail (FIG. 2), tank circuit 16 generally comprises an iron core winding 50 having four spaced taps 51, 52, 53, 54 so that the winding serves as an autotransformer. Coil 20 is connected directly across taps 51, 52, with tap 51 being grounded at a terminal 55. Tap 53 is connected on winding 50 at a point electrically above tap 52 and tap 54 is connected on winding 50 at a point electrically above tap 53. Tank circuit 16 also comprises a pair of capacitors 56, 58. Capacitor 56 and the portion of winding 50 between taps 51, 53 together with coil 20 air-loaded, are chosen to resonate at a selected test frequency whereas capacitor 58 and the inductance of winding 50 between taps 51, 54 together with coil 20 air loaded, are chosen to resonate at a selected lower frequency. A double-pole double-throw switch 60 has a common terminal 61 and a switch arm 62 which is electrically connected to terminal 61. With arm 62 in its upper position as shown in full lines in FIG. 2, capacitor 58 is paralleled across taps 51, 54 with capacitor 58 and winding 50 together with coil 20 connected in series with the terminals 55, 61. With arm 62 in a lowered position capacitor 56 is paralleled with winding 50 between taps 51, 53. A variable resistor 64 is connected between terminal 61 and an input terminal 66. The square wave output from drive 14 is applied to terminal 66 and ground (terminal 55). A trimmer capacitor 67 is also connected across terminal 61 and ground. An output terminal 68 is also connected to terminal 61 for connection to amplifier 28 (FIG. 1).

Tank circuit 18 is substantially similar to tank circuit 16 except for the omission of a probe. An inductor 70 has three taps 71, 72, 73 arranged to be selectively connected in parallel with capacitors 76, 78 by means of a switch 80. Switch 80 has a common terminal 91 and a switch arm 92 for connecting capacitor 78 across taps 71, 73 when arm 92 is in its raised position as viewed in FIG. 2, and for connecting capacitor 76 across taps 71, 72 when the arm is in its lowered position. Terminal 91 is connected directly to input terminal 66 through a variable resistor 94 and also directly to an output terminal 98. Switches 60, 80 are ganged together by a mechanical linkage shown by a dash line and designated by numeral 100 (FIGS. 1 and 2). Linkage 100 is connected to the frequency selector 40 and is manually controlled by the operator.

In accordance with the present invention the values of capacitors 56, 58, 76, 78 and the inductance between the corresponding taps on winding 50 and inductor 70 are chosen such that the input impedance for each tank circuit 16, 18 is balanced at a predetermined constant impedance at all test frequencies when coil 20 is air loaded. With coil 20 connected to winding 50, the inductance between taps 51, 53 equals the inductance between taps 71, 72 on inductor 70 and the inductance between taps 71, 73 equals the inductance between taps 71, 73. The drive of tank circuits 16, 18 can be varied slightly by changing resistors 64, 94. The use of the autotransformer winding 50 for coupling probe 20 into tank circuit 16 is an important feature of the present invention. With this arrangement, a single coil 20 can be used at all of the test frequencies with the proper resonant impedance for each frequency being selected by connection to one of the taps 53, 54. The inductance of coil 20 (air loaded) is equal to the inductance of winding 50 between taps 51, 52 for maximum power transfer. By using the autotransformer coupling of coil 20 into tank circuit 16 a single probe can be used over a wide frequency range by merely selecting the proper tap on winding 50 and the proper parallel capacitor for each test frequency. Although tank circuits 16, 18 have been described for only two test frequencies it will be understood that any number of test frequencies can be used by merely connecting additional capacitors and additional taps on windings 50, 70 and by modifying switches 60, 80.

An operator selects the particular drive frequency desired by means of frequency selector 40 which simultaneously actuates switches 60, 80 to tune tank circuits 16, 18 to resonance at the frequency selected. Regardless of the frequency selected the input impedance of each of the tank circuits 16, 18 as seen from terminal 66 and ground (terminal 55) will remain constant so that for a given drive level the sensitivity of the apparatus remains constant at all frequencies. The drive level can be adjusted by varying resistors 64, 94. When test specimen 22 is inserted into coil 20, trimmer capacitor 67 is adjusted to retune the probe tank circuit 16 to resonance and then resistor 94 in the reference tank circuit 18 is varied to balance the drive level to tanks 16, 18. With tank circuits 16, 18 again balanced, the output from difference amplifier 28 (FIG. 1) will be zero and tank circuits 16, 18 will be set to provide a standard impedance for comparison with additional test specimens. When a specimen 22 is removed from coil 20 and a second test specimen is inserted into the coil, any difference in the characteristics of the two specimens will change the phase and amplitude of the output from probe tank circuit 16 relative to the output from tank circuit 18. The outputs from terminals 68, 98 are compared by the difference amplifier 28 to provide a difference signal representing the difference in characteristics between the two specimens. Quadrature components of the difference signal are detected by detectors 32 and displayed on indicator 38.

FIG. 3 illustrates a probe tank circuit 102 which includes modifications of the probe tank circuit 16 of FIG. 2 with like elements being designated by like reference numerals. Tank circuit 102 may be used with tank circuit 18 (FIG. 2) in place of tank circuit 16. In tank circuit 102 a variable inductor 104 is connected in series with coil 20 across taps 51, 52 of the autotransformer winding 50. Inductor 104 compensates for an inductance change in coil 20 from an air load inductance when a test specimen is inserted into the coil. A variable resistor 106 is connected across trimmer capacitor 67 to compensate for variations in Q (the ratio of inductive reactance to resistance of tank circuit 106) with different materials inserted in the coil 20. Before a specimen is inserted into coil 20 of the tank circuit 102, the tuning of tank circuits 18, 102 is substantially identical to that described in connection with tank circuits 16, 18 (FIG. 2). When a first test specimen is inserted into coil 20, however, it is only necessary to adjust the variable inductor 104 to re-balance the tuning between tank circuits 18, 102. Although inductor 104 will impair the sensitivity of the apparatus to some extent, for certain applications reduced sensitivity can be tolerated or compensated for by other means. Resistor 106 may also be varied to adjust the resonant resistance of the tank circuit 16 shown in FIG. 3 to compensate for Q variations in the tank circuits. A shunt resistor corresponding to resistor 106 could also be used in either of the tank circuits 16, 18 (FIG. 2) to match the Q of the tank circuits. When a second specimen is inserted in coil 20 the output from tank circuit 102 is compared to the output from tank circuit 18 by amplifier 28 (FIG. 1) to provide a difference signal representing the difference in characteristics between the two specimens.

FIG. 4 illustrates a further embodiment of the present invention similar to the circuit shown in FIG. 2, wherein the reference tank circuit 18 (FIGS. 1 and 2) is replaced by a probe tank circuit 112 which is substantially similar to the probe circuit 16. An autotransformer winding 114 having four taps 116, 117, 118 and 119 replaces the inductor 70 of FIG. 2. A second probe coil 126 is connected directly across taps 116, 117. Coil 126 is substantially identical to coil 20. A trimmer capacitor 128 corresponding to capacitor 67 (FIGS. 2 and 3) is connected across terminal 91 of the switch 80 and ground (terminal 55). With coils 20, 126 air loaded, that is, with no specimen inserted into the coils, the tank circuits 16, 112 are tuned automatically to resonance at the test frequency selected by means of switches 60, 80 in the manner set forth in connection with FIG. 2. One specimen is inserted into coil 126 to serve as a standard for comparison with a second specimen inserted into coil 20. Tank circuits 16, 112 are then each tuned to resonance by means of trimmer capacitors 67, 128. Any difference in the characteristics of the two specimens will provide an impedance variation in probe circuit 16 and a corresponding difference signal in the output of amplifier 28 (FIG. 1) having phase and amplitude variations corresponding to the difference in the characteristics.

In accordance with one important aspect of the present invention, an autotransformer in the probe tank circuit eliminates apparent impedance variations in the tank circuit resulting from impedance variations in the probe coil with frequency. For example, for test frequency variations of 100:1, the inductive reactance of the probe coil will also vary 100:1. Additionally a 10:1 variation in the inductive reactance of the probe occurs between its loaded and unloaded conditions. Thus a maximum inductive reactance variation of 1000:1 should be compensated for. The 10:1 inductance variation due to loading of the probe can be compensated for in the tank circuits in the manner described hereinabove. Without the use of an autotransformer, the 100:1 variation in the inductive reactance due to frequency would require the use of separate probes or different drive levels for each test frequency. By using the variable transformer coupling of the probe coil into the tank circuit to keep the apparent probe impedance constant, a single probe may be used at all test frequencies and thus the 100:1 variation in inductive reactance due to frequency is eliminated. With an autotransformer, the probe is connected directly across the autotransformer and the transformer ratio is varied with frequency to keep the impedance at the output of the autotransformer constant.

It will be understood that the probe circuit for use in material testing apparatus which is herein described and disclosed is presented for purposes of explanation and illustration and is not intended to indicate limits of the invention, the scope of which is defined in the following claims.

What is claimed is:

1. In a multi-frequency apparatus for use in eddy current testing, a source of drive signals having a first frequency selected within a range of test frequencies, means for changing the frequency of said drive signals to a second frequency within said range, a fixed inductance probe arranged and adapted to be excited by said drive signal to provide an output, said output representing characteristics of a test specimen when said probe is loaded by said specimen, means providing a standard impedance output for comparison with said probe output when said probe is loaded by said specimen, variable transformer means connected between said source of drive signals and said probe, control means coupled to said transformer means to vary the transformer means for maintaining an apparent impedance of said probe constant at said first and said second frequencies in the absence of said specimen, means for comparing said standard impedance output with said probe output to provide a difference signal when said probe is loaded by said specimen, and means responsive to said difference signal for indicating characteristics of said specimen.

2. In a multi-frequency apparatus for use in non-destructive testing, a source of drive signals having a first frequency selected within a range of test frequencies, means for changing the frequency of said drive signals to a second frequency within said range, a fixed inductance probe arranged and adapted to be excited by said drive signal to provide an output signal representating characteristics of a test specimen when said probe is loaded by said specimen, probe circuit means operatively coupled between said probe and said source of drive signals to minimize inductive reactance variations due to inductive reactance variations of said probe with frequency when said probe is selectively excited by said first or said second frequency comprising transformer means having first and second winding portion inductively coupled together, said first winding portion having first and second pairs of terminals, said second winding portion having a third pair of terminals, said probe being operatively connected in closed circuit with said third pair of terminals, and switch means for selectively connecting said source of drive signals to said first pair of terminals for said first frequency drive signals and to said second pair of terminals for said second frequency drive signals.

3. The device set forth in claim 2 wherein said transformer means comprises an autotransformer coil having first, second, third and fourth taps, said third tap being electrically between said first and second taps, said fourth tap being electrically between said first and third taps, said probe being connected in a branch circuit across said first and fourth taps, and said switch means being operative to selectively connect said source of drive signals to said second tap at said one frequency and to said third tap at said second frequency.

4. In a multi-frequency instrument for use in eddy current testing, a source of stable frequency sinusoidal signals, conversion means responsive to said signals to provide a square wave drive signal, means for selectively varying said drive signal between a first and a second frequency, a parallel tuned circuit having a capacitive reactance leg and an inductive reactance leg, said tuned circuit being operatively coupled to said conversion means to apply said square wave drive signal across said tuned circuit, a fixed inductance probe coupled in said inductive reactance legs and arranged and adapted to be excited by said drive signal to provide an output signal, said output signal representing characteristics of a test specimen when said probe is loaded by said specimen, and switch means operatively connected to said tuned circuit for changing the amount of reactance in said circuit to minimize inductive reactance variations of said inductive reactance leg due to changes in frequency between said first and second frequency.

5. The combination set forth in claim 4 wherein said inductive reactance branch comprises a transformer winding having first and second portions, said probe being inductively coupled to said winding, and said switch means being actuatable between a first condition for selectively connecting said first winding portion to said capacitive reactance leg at said first frequency and a second condition for connecting said second winding portion to said capacitive reactance leg at said second frequency.

6. In a multi-frequency instrument for use in eddy current testing, a source of stable frequency sinusoidal signals, conversion means responsive to said signals for providing a square wave drive signal, means for selectively varying said drive signal between a first frequency and a second frequency, and a probe input circuit operatively connected to said conversion means to be energized by said drive signals and arranged and adapted to provide an output signal representing a difference in characteristics between a test specimen and a standard comprising a first tuned circuit having a capacitive reactance leg and an inductive reactance leg, a second tuned circuit having a capacitive reactance leg and an inductive reactance leg, a fixed inductance probe coupled inductively to said inductive reactance leg of said second tuned circuit, switch means for changing reactive components in said legs of said first and said second tuned circuits in predetermined increments to maintain the impedance of said tuned circuits constant at said first frequency and said second frequency, and means connected to said first and second tuned circuits to provide a difference signal.

7. In a multi-frequency instrument for use in eddy current testing, a source of stable frequency sinusoidal signals, conversion means responsive to said signals for providing a square wave drive signal, means for selectively varying said drive signal between a first frequency and a second frequency, and a probe input circuit operatively connected to said conversion means to be energized by said drive signals and arranged and adapted to provide an output signal representing a difference in characteristics between a test specimen and a standard comprising a first tuned circuit having a capacitive reactance leg and an inductive reactance leg, a second tuned circuit having a capacitive reactance leg and an inductive reactance leg, a fixed inductance probe coupled inductively to said inductive reactance leg of said second tuned circuit, switch means for changing reactive components in said legs of said first and said second tuned circuits in predetermined increments to maintain the impedance of said tuned circuits constant at said first frequency and said second frequency, said inductive reactance leg of said second tuned circuit comprising a transformer winding having a first and a second pair of terminals, said switch means being operative to connect said first pair of terminals in said second tuned circuit at said first frequency and said second pair of terminals in said second tuned circuit at said second frequency, and means connected to said first and second tuned circuits to provide a difference signal.

8. The device set forth in claim 7 wherein said transformer winding comprises an autotransformer coil having first, second, third and fourth taps, said third tap being electrically between said first and second taps, said fourth tap being electrically between said first and third taps, said probe being connected in a branch circuit across said first and fourth taps and said switch means being operable to selectively connect and first and second taps in said inductive leg of said second tuned circuit at said first frequency and said first and third taps in said inductive leg of said second tuned circuit at said second frequency.

9. In a multi-frequency instrument for use in nondestructive testing, a source of drive signals selectively operable at a first or a second frequency, a fixed inductance probe arranged and adapted to be excited by said drive signals to provide an output signal, said output signal representing characteristics of a test specimen when said probe is loaded by said specimen, an autotransformer winding having first, second, third and fourth taps, said third tap being electrically between said first and second taps and said fourth tap being electrically between said first and third taps, a branch circuit including said probe connected directly across said winding between said first and fourth taps, and switch means for selectively connecting said first and third taps to said source when said source is operating at a first frequency and for connecting said first and second terminals to said source when said source is operating at a second frequency.

10. A device set forth in claim 9 wherein a variable inductor is connected in series with said probe across said first and said fourth terminals.

References Cited by the Examiner
UNITED STATES PATENTS

| | | | |
|---|---|---|---|
| 2,887,651 | 5/1959 | Piip | 324—40 |
| 2,928,043 | 3/1960 | Foerster | 324—40 |
| 3,059,749 | 10/1962 | Zinke | 324—34 |

WALTER L. CARLSON, *Primary Examiner.*

R. B. WILKINSON, R. J. CORCORAN,
*Assistant Examiners.*